US008625753B1

(12) United States Patent
Peden et al.

(10) Patent No.: US 8,625,753 B1
(45) Date of Patent: Jan. 7, 2014

(54) DELIVERING RECALLABLE MESSAGES VIA INTERNET OR TELEPHONY COMMUNICAITON PATHS (75) Inventors: Mark Douglas Peden, Olathe, KS (US); Gary Duane Koller, Overland Park, KS (US); Raymond Emilio Reeves, Olathe, KS (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 228 days.

(21) Appl. No.: 13/152,424

(22) Filed: Jun. 3, 2011

(51) Int. Cl.
*H04M 1/64* (2006.01)

(52) U.S. Cl.
USPC .................................. 379/88.22; 709/206

(58) Field of Classification Search
USPC .................... 379/88.22–88.28; 706/205–207; 709/205–207
See application file for complete search history.

(56) References Cited

U.S. PATENT DOCUMENTS

| | | | |
|---|---|---|---|
| 6,490,614 B1 * | 12/2002 | Shaffer et al. | 709/206 |
| 6,781,962 B1 * | 8/2004 | Williams et al. | 370/259 |
| 6,978,316 B2 * | 12/2005 | Ghaffar et al. | 709/246 |
| 7,697,667 B1 | 4/2010 | Wageman et al. | |
| 8,055,713 B2 * | 11/2011 | Simske et al. | 709/206 |
| 8,255,470 B2 * | 8/2012 | Jackson et al. | 709/206 |
| 2005/0124360 A1 | 6/2005 | Choi | |
| 2006/0239424 A1 * | 10/2006 | Walter | 379/88.22 |
| 2007/0286354 A1 | 12/2007 | Shaffer et al. | |
| 2009/0013087 A1 | 1/2009 | Lorch et al. | |
| 2009/0271486 A1 | 10/2009 | Ligh | |
| 2010/0325470 A1 * | 12/2010 | Underwood et al. | 714/2 |

OTHER PUBLICATIONS

Office Action, mailed Jan. 8, 2013, U.S. Appl. No. 13/034,393.

* cited by examiner

*Primary Examiner* — Duc Nguyen
*Assistant Examiner* — Assad Mohammed (57) ABSTRACT

A method, system, and medium are provided for delivering recallable messages via Internet or telephony paths. A sender may configure a message as a recallable message on a communication device that is communicatively connected to a messaging alert platform. The request is delivered to a messaging alert platform, which then delivers the recallable message on the Internet or telephony paths. The messages are formatted by the messaging alert platform based to comply with the requirements of the selected communication path. The messaging alert platform attempts delivery until all paths are exhausted or a response, not an auto-reply, is received from the recipient of the message. The responses are filtered by the messaging alert platform before delivering the response from the recipient to the user.

20 Claims, 7 Drawing Sheets

PLEASE SELECT YOUR RESPONSE PREFERENCE
- EMAIL ~511
- PUSH-TO-TALK ~512
- SMS ~513
- CALL ~514
- SOCIAL NETWORK ~515
- BLOG ~516
- MAP ~517

*FIG. 5A*

PLEASE SELECT YOUR RESPONSE LIMIT
- 30 SEC ~521
- 90 SEC ~522
- 30 MIN ~523
- 1 HOUR ~524
- OTHER ~525

*FIG. 5B*

WOULD YOU LIKE TO MAKE THIS A MAP COMMUNICATION? ~531

[ YES ]  [ NO ]

☐ MAKE ALL COMMUNICATION VIA MAP

DELIVERING RECALLABLE MESSAGES VIA INTERNET OR TELEPHONY COMMUNICAITON PATHS

RELATED APPLICATION

This application is related to U.S. patent application Ser. No. 13/034,393, filed 24 Feb. 2011, and titled "RECALLING USER-GENERATED MESSAGES," which is hereby incorporated by reference in its entirety.

SUMMARY

Embodiments of the invention are defined by the claims below. Embodiments of the invention provide wireless devices, methods, and computer-readable media for, among other things, routing a recallable messages to a recipient. The embodiments of the invention have several practical applications in the technical arts including providing visibility of a message across multiple communication services, reaching a recipient within a sender defined period of time, and providing recall of the recallable message from communication services where the recipient was unavailable or unresponsive.

In an embodiment, a computer system generates recallable messages. The computer system includes a sender's communication device and messaging alert platform. The messaging alert platform is communicatively coupled to the sender's communication device. The messaging alert platform is configured to receive a request to transmit recallable messages. In turn, the messaging alert platform attempts delivery of the recallable messages at communication paths available for recipients of the recallable messages. The messaging platform may receive and filter replies in accordance with preferences established by the sender. In some embodiments, the messaging alert platform includes an account manager, a transcoder, a control manager, a parser, storage, recall logic, and communication interfaces.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention provide a messaging alert platform that allows senders to track delivery of a recallable message on multiple communication paths. The messaging platform provides the senders with notifications when recallable messages transmitted by the senders are delayed during transmission to an intended recipient or not delivered to the intended recipient. The senders are able to configure the message alert platform with message handling options that specify alternate communication paths, alternate communication formats, or alternate accounts for delivery of the recallable messages. The alternate accounts include short messaging service accounts, multimedia message service accounts, instant messaging accounts, and social networking accounts. The message handling options include various forms of electronic messaging and social networking accounts. When an alternate communication path, alternate communication format, or alternate account is selected and the messaging alert platform retries delivery of the recallable message, the original recallable message is recalled. Because senders have grown accustomed to near instant communication, delivery delays of the recallable message to the intended recipient are not tolerated. Accordingly, embodiments of the invention allow senders to specify a reply period that indicates a maximum length of time that may transpire before the sender expects to receive a reply.

It should be understood that this and other arrangements described herein are set forth only as examples. Other arrangements and elements (e.g., machines, interfaces, functions, orders, and groupings of functions, etc.) can be used in addition to, or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Throughout this description, several acronyms and shorthand notations are used to aid the understanding of certain concepts pertaining to the associated system and services. These acronyms and shorthand notations are intended for the purpose of providing an easy methodology of communicating the ideas expressed herein and are not meant to limit the scope of the embodiments of the invention. The following is a nonexhaustive list of these acronyms:

| | |
|---|---|
| 3G | Third-Generation Wireless Telephone Technology |
| 4G | Fourth-Generation Wireless Telephone Technology |
| API | Application Programming Interface |
| BSC | Base Station Controller |
| CDMA | Code Division Multiple Access |
| CD-ROM | Compact Disk Read Only Memory |
| DVD | Digital Versatile Discs |
| EEPROM | Electrically Erasable Programmable Read Only Memory |
| GPRS | General Packet Radio Service |
| GSM | Global System for Mobile Communications |
| iDEN | Integrated Digital Enhanced Network |
| IP | Internet Protocol |
| MAP | Messaging Alert Platform |
| MMS | Multimedia Messaging Service |
| PC | Personal Computer |
| PCS | Personal Communications Service |
| PDA | Personal Digital Assistant |
| RAM | Random Access Memory |
| ROM | Read Only Memory |
| SMS | Short Message Service |
| TDMA | Time Division Multiple Access |
| UMTS | Universal Mobile Telecommunications Systems |
| WiMAX | Worldwide Interoperability for Microwave Access |

Embodiments of the invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1A:
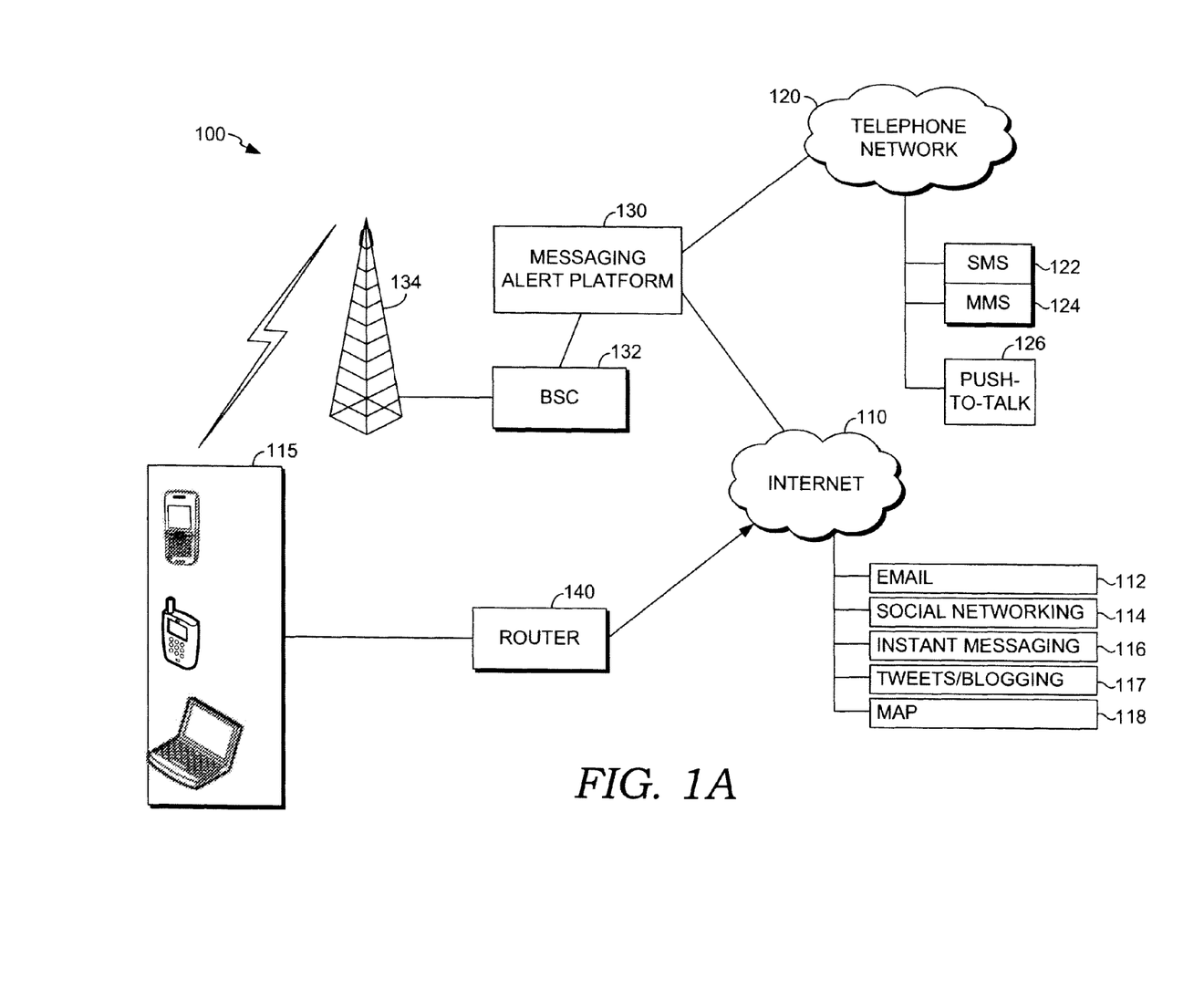
FIG. 1A is a network diagram of an exemplary computing system in accordance with embodiments of the invention.

FIG. 1A is a network diagram of an exemplary computing system 100 in accordance with embodiments of the invention. The computing system 100 includes Internet 110, email service 112, social networking service 114, communication devices 115, instant messaging service 116, tweet/blogging service 117, MAP service 118, telephone network 120, SMS 122, MMS 124, Push-to-Talk 126, MAP 130, BSC 132, antennae 134, and router 140.

The communication devices 115 are connected to MAP 130. The communication devices 115 transmit recallable messages to intended recipients over a communication network. In some embodiments, the communication network may be the telephone network 120 or the Internet 110. In one embodiment, the communication devices 115 transmit the recallable message via antennae 134. Antennae 134 are connected to BSC 132. BSC 132 is connected to MAP 130. In another embodiment, the communication device transmits the recallable message via router 140. Router 140 is connected to Internet 110. Internet 110 is connected to MAP 130. In turn, MAP 130 transmits the recallable message to the intended recipients.

The Internet 110 is a communication network that provides the communication devices 115 of the sender with multiple communication paths to the intended recipients. The Internet 110 comprises a collection of network switches that route the recallable message. The Internet 110 may provide the senders with access to communication services, like email services 112, social networking services 114, instant messaging services 116, tweet/blogging services 117, and MAP services 118.

Email service 112 enables the sender to transmit an electronic message to the intended recipient. The MAP 130 configures the electronic message transmitted via email service 112 to be recallable. In some embodiments, the email service 112 may be an agent executing on the communication device 115 of the sender.

Social networking service 114 enables the sender to transmit an electronic message to the intended recipient. Social networking service 114 may also allow the sender to transmit instant messages or communicate via messaging boards. The MAP 130 configures the messages transmitted via social networking service 114 to be recallable. In some embodiments, the social networking service 114 may be an agent executing on the communication device 115 of the sender.

Instant messaging service 116 enables the sender to transmit an electronic message to the intended recipient. The instant messaging service 116 allows the sender to have an electronic conversation with an intended recipient that is available and online. If the intended recipient is unavailable or offline, the sender may leave a message that the intended recipient can retrieve when available and online. The MAP 130 configures the messages transmitted via instant messaging service 116 to be recallable. In some embodiments, the instant messaging service 116 may be an agent executing on the communication device 115 of the sender.

Tweet/blogging service 117 enables the sender to transmit an electronic message to a collection of intended recipients. The tweet/blogging service 117 allows the sender to broadcast the electronic message to intended recipients that are available and online. If the intended recipients are unavailable or offline, the sender may leave the message that the intended recipients may retrieve when available and online. The MAP 130 configures the messages transmitted via tweet/blogging service 117 to be recallable. In some embodiments, the tweet/blogging service 117 may be an agent executing on the communication device 115 of the sender.

MAP service 118 enables the sender to transmit an electronic message to the intended recipient. The MAP service 118 allows the sender to communicate the electronic message to the intended recipient that has a MAP compliant communication device 115. If the communication devices 115 of intended recipient are MAP compliant, the sender may transmit the message to the intended recipient. The MAP 130 configures the messages transmitted via MAP service 118 to be recallable. In some embodiments, the MAP service 118 may be an agent executing on the communication device 115 of the sender or intended recipient.

The telephone network 120 is a communication network that provides the communication devices 115 of the sender with multiple communication paths to the intended recipients. The telephone network 120 comprises a collection of telephone switches that route the recallable message. The telephone network 120 may provide the senders with access to communication services, like SMS 122, MMS 124, and PTT services 126.

The Internet and telephone networks might comprise, for example, a cable network, a wireless network (e.g., a wireless telecommunications network), or a combination thereof or portions thereof. A wireless telecommunications network refers to any type of telecommunications network that is wireless. Examples of wireless telecommunications technologies include, but are not limited to, Global System for Mobile Communications (GSM), General Packet Radio Service (GPRS), Code Division Multiple Access (CDMA), CDMA2000, CDMAOne, Time Division Multiple Access (TDMA), Universal Mobile Telecommunications Systems (UMTS), Integrated Digital Enhanced Network (iDEN), WiMAX, 3G, 4G, and Personal Communications Service (PCS). A wireless telecommunications network might include an array of devices, which are not shown so as to not obscure more relevant aspects of the invention. Components such as a base station controller, a communications tower, or even access points (as well as other components) can provide wireless connectivity in some embodiments.

SMS 122 enables the sender to transmit an electronic message to the intended recipient. The SMS 122 allows the sender to communicate the electronic message to the intended recipient. The MAP 130 configures the messages transmitted via SMS 122 to be recallable. In some embodiments, the SMS 122 may be an agent executing on the communication device 115 of the sender or intended recipient.

MMS 124 enables the sender to transmit an electronic message to the intended recipient. The electronic message may include multimedia information, e.g. audio, image, and video. The MMS 124 allows the sender to communicate the electronic message to the intended recipient. The MAP 130 configures the messages transmitted via MMS 124 to be recallable. In some embodiments, the MMS 124 may be an agent executing on the communication device 115 of the sender or intended recipient.

PTT service 126 enables the sender to transmit a voice communication to the intended recipient. The PTT service 126 allows the sender to communicate the voice communication to the intended recipient. The PTT voice communications are not recallable. In some embodiments, the PTT service 126 may be an agent executing on the communication device 115 of the sender or intended recipient.

In some embodiments, MAP 130 provides feedback regarding message delivery to the communication device 115 of the sender. MAP 130 streamlines and improves the process of contacting the intended recipient quickly. MAP 130 utilizes all available communication formats in a staggered manner to increase the probability that the intended recipient will reply to the message received from the sender. The sender no longer has to guess whether the message was received and consumed by the intended recipient. MAP 130 tracks messages sent via the communication services, e.g., email service 112, social networking service 114, instant messaging service 116, tweet/blogging service 117, MAP service 118, SMS 122, MMS 124, Push-to-Talk 126, and informs the sender about a delay or nondelivery of message. In some embodiments, MAP 130 is a proxy for all messages generated by the communication device 115. In other embodiments, MAP 130 is a proxy for messages generated by the communication devices 115 and replies received from the intended recipients. A MAP agent executing on the communication device may reformat the communication message and includes an address for MAP 130 as the care of address for the communication messages generated by the communication devices 115 or addressed to the communication devices 115.

If the intended recipient's communication device 115 is turned off when the electronic message sent via email service 122 is received, an auto-reply may be sent to the MAP 130. If the electronic message is not delivered within a sender predetermined time frame, the electronic message will be resent via the second, third, fourth, etc. communication paths selected by the sender as alternates for the intended recipient. In some embodiment, MAP 130 may learn alternate communication paths for the intended recipient from the auto-reply generated by the intended recipient's communication device 115.

BSC 132 provides the communication devices access to the MAP 130. The BSC 132 is connected to the MAP and antennae 134. BSC 132 routes communications received from antennae 134. The MAP communications are routed to MAP 130 by BSC 132.

Antennae 134 provide an interface for receiving communications over the air from the communication devices 115. The antennae 134 allow the senders to transmit the electronic messages to the intended recipients. Antennae 134 are connected to BSC 132, which routes the MAP electronic message 118 to MAP 130.

Router 140 provides an alternate interface for receiving communications from the communication devices 115. The router 140 allows the senders to transmit the electronic messages to the intended recipients. Router 140 is connected to MAP 130 via the Internet 110. Router 140 transmits the MAP electronic message to MAP 130. In some embodiments, the communication devices 115 may connect to the router 140 wirelessly or via wires.

The foregoing description of the computing system 100 was illustrative and was not intended to limit the scope of the claimed invention. One of ordinary skill in the art appreciates and understands that computing system 100 has been simplified. Further, embodiments of the invention may interface with numerous other computing systems.

Embodiments of the invention utilize a communication device to generate recallable electronic messages. The communication devices 115 also receive the replies to the recallable electronic messages. The communication devices 115 may include agents that provide several communication services, e.g., email service 112, social networking service 114, instant messaging service 116, tweet/blogging service 117, MAP service 118, SMS 122, MMS 124, Push-to-Talk 126, etc.

Figure 1B:
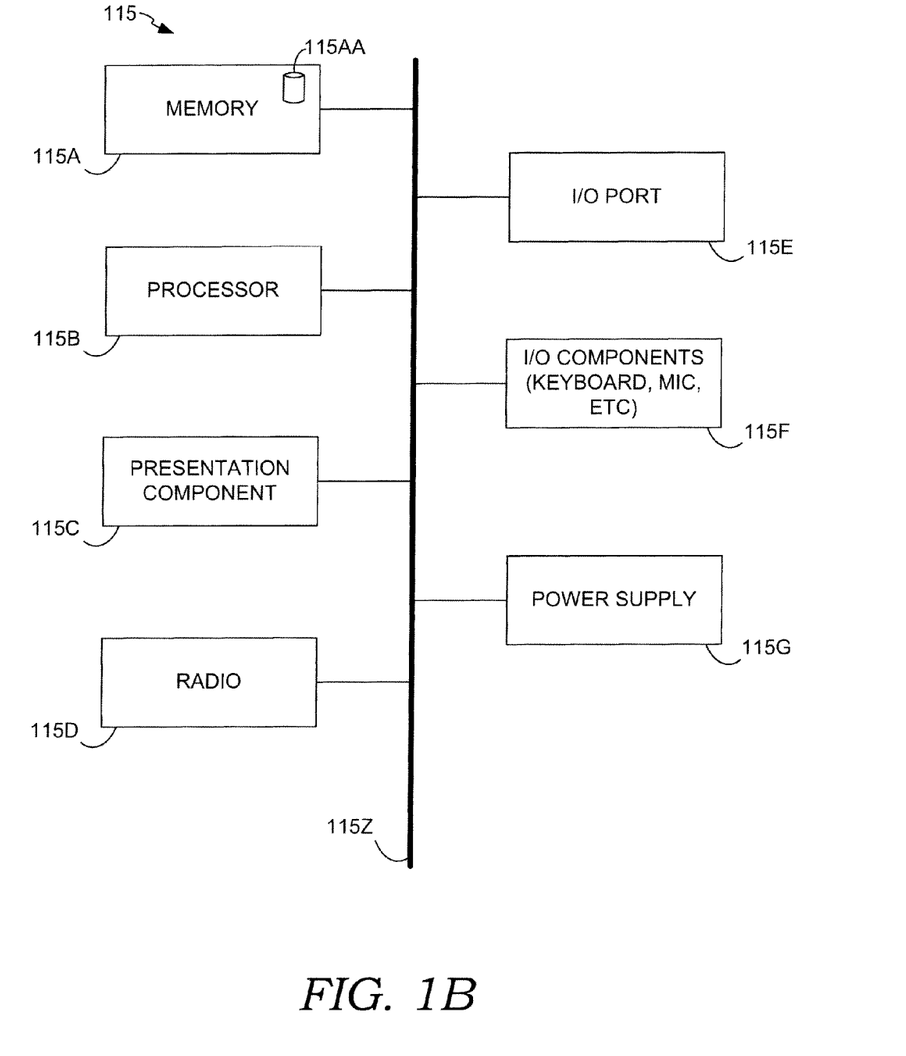
FIG. 1B is a block diagram of an exemplary communication device in accordance with embodiments of the invention.

FIG. 1B is a block diagram of an exemplary communication device 115 in accordance with embodiments of the invention. Turning now to FIG. 1B, a block diagram of an illustrative wireless communication device ("communication device") is provided and referenced generally by the numeral 115. Although some components are shown in the singular, they may be plural. For example, communication device 115 might include multiple processors or multiple radios, etc. As illustratively shown, communication device 115 includes a bus 115Z that directly or indirectly couples various components together including memory 115A, a processor 114B, a presentation component 115C, a radio 115D, input/output ports 115E, input/output components 115F, and a power supply 115G.

Memory 115A might take the form of computer storage media. Memory 115A may store records 115AA that store profile information for the communication device 115. Memory component 115A can include any type of medium that is capable of storing information in a manner readable by a computing device. Processor 115B might actually be multiple processors that receive instructions and process them accordingly. Presentation component 115C includes the likes of a display, a speaker, as well as other components that can present information (such as a lamp (LED), or even lighted keyboards).

Radio 115D represents a radio that facilitates communication with a wireless telecommunications network. Illustrative wireless telecommunications technologies include CDMA, GPRS, TDMA, GSM, and the like. In some embodiments, radio 115D might also facilitate other types of wireless communications including Wi-Fi communications and GIS communications.

Input/output port 115E might take on a variety of forms. Illustrative input/output ports include a USB jack, stereo jack, infrared port, proprietary communications ports, and the like. Input/output components 115F include items such as keyboards, microphones, touch screens, and any other item usable to directly or indirectly input data into communication device 115. Power supply 115G includes items such as batteries, fuel cells, or any other component that can act as a power source to power communication device 115.

The communication device 115 may take on a variety of forms, such as a personal computer (PC), a laptop computer, a wireless phone, a personal digital assistant (PDA), or any other device that is cable of communicating messages to service providers or recipient devices. In some embodiments, the communication device communicates over a wireless telecommunications network. In this regard, the communication device communicates with other devices using a wireless telecommunications network.

The communication device 115 is utilized to communicate messages to one or more recipient devices, or recipients associated therewith, via a service. As used herein, a message refers to any message that can be communicated to a recipient or a recipient device (e.g., via a service) from the communication device 115 or user associated therewith. A user can generate a message (i.e., a user-generated message) using the communication device 115. In this regard, a user can input a message by way of the communication device 115, for example, using voice, text, a stylus, motion, or any other means capable of inputting a message that is directed to one or more recipients.

A message might be, for instance, a voicemail message, PTT message, a social network message, a text message, a multimedia message, an instant message, an electronic message, or the like. Messages can be communicated to a recipient(s) or a recipient device(s) via an appropriate service provider. A service provides message communication services for a user(s). Among other things, a service can facilitate delivery of messages from a user or user device to a recipient or recipient device. By way of example only, a service may be a voice service, a text message service, a social network service, an electronic message service, an instant message service, or the like. A voice service provides voice services to users. An exemplary voice service might be a wireless service provider, such as Sprint®, AT&T®, etc. A text message service provides text messaging services to users. An exemplary text message service might be a wireless service provider, such as Sprint®, AT&T®, etc. A social network service provides social networking services to users. An exemplary social network service might be, for example, Facebook®, MySpace®, Twitter®, etc. An electronic message service provides email services to users. An exemplary electronic message service might be, for example, Hotmail®, Gmail®, etc. An instant message service provides instant messaging services to users. An exemplary instant messaging service might be, for example, AOL® Instant Messenger. As can be appreciated, in some cases, a service provider can provide more than one type of service. For example, a wireless service may provide voice and text message services to users.

Referring to the drawings generally, and to FIG. 1B in particular, an exemplary communication device 115 for practicing embodiments of the invention is provided. It will be understood and appreciated by those of ordinary skill in the art that the communication device 115 shown in FIG. 1 is merely an example of one suitable communication device 115 and is not intended to suggest any limitation as to the scope of use or functionality of the present invention. Neither should the communication device 115 be interpreted as having any dependency or requirement related to any single component or combination of components illustrated therein. The single unit depictions are meant for clarity, not to limit the scope of embodiments in any form.

Figure 2:
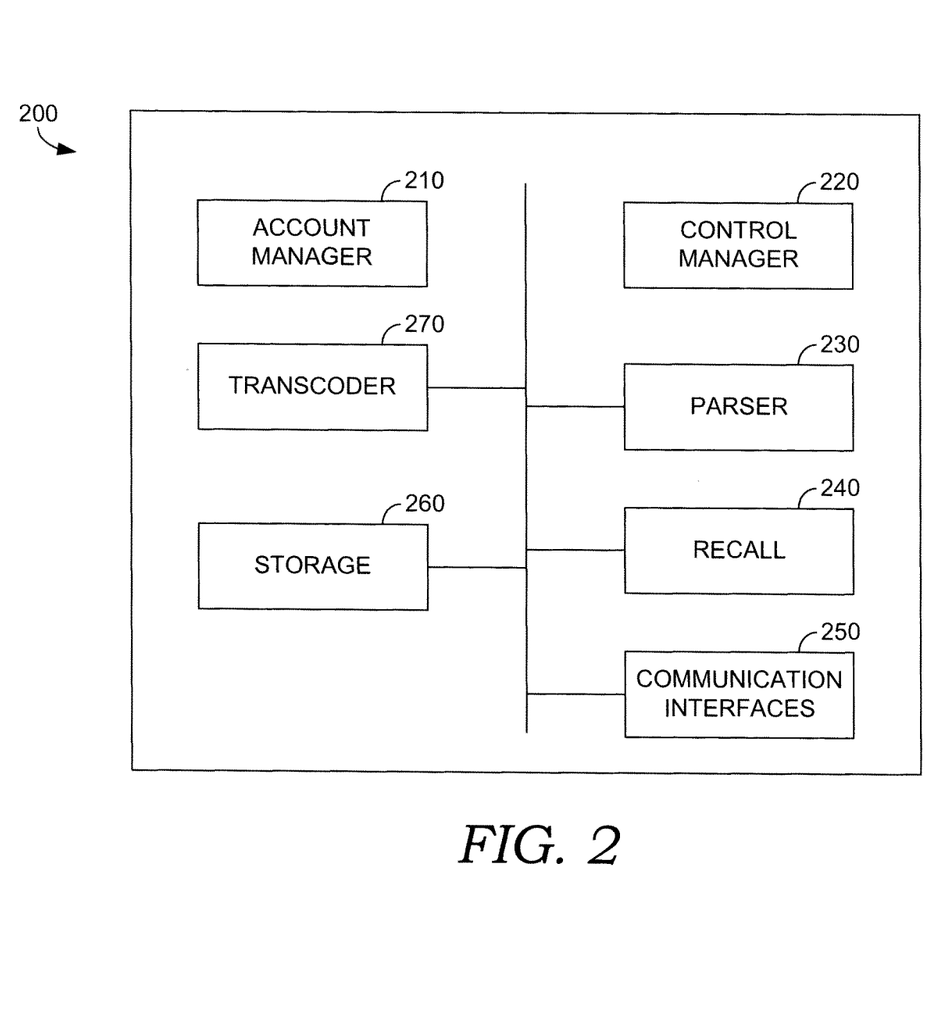
FIG. 2 is a component diagram of an exemplary messaging alert platform in accordance with embodiments of the invention.

FIG. 2 is a component diagram of an exemplary messaging alert platform 200 in accordance with embodiments of the invention. MAP 200 includes an account manager 210, control manager 220, parser 230, recall component 240, communication interfaces 250, storage 260, and transcoder 270.

MAP 200 allows users to subscribe via the account manager 210. The account manager 210 is configured to establish and manage user accounts associated with service providers. In this regard, the account manager 210 may obtain account data associated with pre-existing user accounts established with the service providers. Account data refers to data associated with a user account (i.e., an account established for a user that uses a service) established with a service provider. For example, assume the user has accounts with the social networking service provider 114, the email service provider 112, and the voice service provider 120. In this instance, the account manager 210 may be used to receive, retrieve, access, identify, or reference account data for each of the user accounts associated with such service providers. In some embodiments, the user identifies MAP 200 as a trusted service that shares personal information across several of the user's accounts. Account data may include, for example, a user identifier that identifies an account user (e.g., a user name), a user device identifier that identifies a device associated with an account user (e.g., an IP address, a mobile device number, etc.), a password for an account, an account identifier that identifies a particular account or service provider thereof, and/or the like. Such account data might be input by a user, for example, via the communication device. Alternatively, account data might be provided via the service provider or identified by the account manger 210.

In one embodiment, a database may be used to store user account data in storage 260. For instance, the data store may store an indication of a user account and account data (e.g., user identifier and password) associated therewith in connection with a particular user. The data store may store account data for any number of users. As discussed more fully below, such account data can be referenced and, thereafter, used to obtain and/or recall messages associated with a corresponding user account.

Accordingly, the account manger 210 allows the user to establish an account with MAP 200 and link other communication accounts to MAP. The other communication accounts include voice accounts, email accounts, instant messaging accounts, MMS accounts, SMS accounts, social networking accounts, and the like. MAP 200 may be a trusted server that stores existing account identifiers and passwords for the communication accounts. Optionally, MAP 200 may provide users the option to establish an interaction preference. The interaction preference specifies whether the users prefer interacting with MAP 200 as an agent on the communication device or as an Internet web service that is accessible from any device.

MAP 200 allows users to identify recipients of the recallable message via the control manager 220. Control Manager 220 allows the user to establish a contact sequence and reply period. For instance, the user may specify that urgent messages should be replied to by an intended recipient within 30 seconds. Also, the user may specify, via the control manager 220, a number of different contact methods for the intended recipient. If the user has three contact methods for the intended recipient: phone, email, social network, and the user may specify a contact sequence for the intended recipient to be first: phone, second: social network, and third: email. Thus, if the user unsuccessfully attempts to call the phone of the intended recipient with an urgent MAP communication, MAP 200 will then forward the message to the social network contact for the user. If the user is unable to reach the intended recipient via the social network contact, MAP forwards the message to the email contact of the intended recipient. MAP 200 reports the success or failure of message delivery to the user. When MAP 200 receives an indication that the intended recipient is unavailable or nonresponsive, an alternate contact method is selected and if necessary the message is reformatted for delivery via the alternate contact method.

In some embodiments, control manger 220 stores contact information from each account registered with MAP 200 in a contact database. In other embodiments, users may provide MAP 200 with access to the user's contact database. The contact database may be stored on the communication device. In one embodiment, the contact database is stored at a remote location accessible by the control manager via uniform resource locator specified by the user. If required to access the contact information, the contact manager identifier and password may be stored by the control manager 220.

Accordingly, control manger 220 may leverage accessibility to the various accounts and automatically synch contacts with the most recent contact information stored by the various accounts. In one embodiment, the user will also be provided an option to manually synch contacts and communication methods across the various accounts and the contact database maintained by the control manager 220. The synched contact database is utilized by the control manager 220 to enable the MAP user to specify the contact sequence for intended recipients with updated and accurate contact information.

MAP 200 determines whether the intended recipient replied to the message via a parser 230. Parser 230 extracts the reply from the response message received from the intended recipient. The reply may be generated via the social networking service, email service, SMS service, etc. For instance, the MAP 200 may receive an auto-reply from the intended recipient. In this case, parser 230 extracts information from the reply, which may state "I am unavailable until May 13. Please contact Bob at xxyz@acme.corp." The parser 230 may recognize new contact information included in the extracted information. In some embodiments, the parser 230 extracts the new contact information and may transmit the new contact to the control manager 220. In turn, the control manager 220 updates the contact database with the new contact.

Moreover, the control manager 220 may update the contact sequence for the intended recipient to include the new contact. In one embodiment, the user positions the new contact in the desired position within the contact sequence. In an alternate embodiment, the control manager 220 places the new contact at the last position in the contact sequence. Accordingly, the parser 230 is able to extract the response from the replies in any format that it is received.

In some embodiments, the message transmitted to the intended recipient may be recallable if the intended recipient did not read the message. The recall component 240 is configured to manage messages transmitted by the user. For instance, the recall component 240 enables a user to manage messages generated via email service, social networking service, instant messaging service, tweet/blogging service, MAP service, SMS, MMS, Push-to-Talk, and the like. MAP 200 may recall the message when a response from the intended recipient is not received within a specified period of time, e.g., 10 seconds.

In other embodiments, MAP 200 may continue generating messages within the contact sequence and recall previous messages that were sent using a different contact method once the contact sequence is exhausted. For example, the contact sequence for an intended recipient may include SMS, email, and voicemail. MAP 200 initially attempts delivery of the message via SMS. When as SMS reply is not received within a specified time period, MAP 200 transmits the message to the intended recipient via email. Similarly, when an email reply is not received within a specified time period, MAP 200 transmits the message to the intended recipient via voice, e.g. voicemail. If the intended recipient fails to respond to all the messages within a specified time period, e.g. 90 seconds, recall component 240 recalls each message (SMS, email, and voicemail) sent to the intended recipient. The recall component 240 removes the messages from the intended recipient's message box. The recall component 240 manages messages sent via a voice service, a text message service, an email service, and a social network service. In some cases, the recall component 240 may be a part of or hosted by one of the services or a network. In other cases, the recall component 240 may operate independent from the services and may reside on a wireless device, etc.

MAP 200 includes communication interfaces 250 that connect to the network elements that provide the email service, social networking service, instant messaging service, tweet/blogging service, MAP service, SMS, MMS, Push-to-Talk, and the like. The communication interfaces 250 may include Ethernet or the like. The messages are transmitted over the communication interfaces 250. In turn, the replies are received over the communication interfaces 250. Accordingly, MAP 200 may interface with the wireless devices and services to implement a recallable message delivery system.

MAP 200 may include storage 260. The storage 260 may be configured to store a contact database for each user that authorized MAP 200 to store contacts for the intended recipients. In some embodiment, the storage 260 may store all contacts for the intended recipients a user may communicate with. In an alternate embodiment, the storage 260 may store only selected contacts for less than all of the intended recipients that the user communicates with. The storage 260 may also store the contact sequence specified for the intended recipients. The storage 260 may also include user-preferences. The user may specify a preference to receive responses via SMS. Further, the user may specify a reply period to be 30 seconds for an intended recipient. Alternatively, the user may specify that a default reply period is 120 seconds. These types of preferences may be stored for each user in storage 260.

Moreover, in some embodiments, the messages generated by the user are stored in storage 260. By way of example, the storage 260 might store each message sent via one of the services when the user indicates the message should be recallable. For example, the storage 260 may store messages indicated as high priority, messages of a particular type (e.g., text message, voice message, email message), messages communicated via a particular service, messages sent at a particular time or within a particular time duration, or the like. In other embodiments, the storage 260 may retain only a portion of the messages, or data associated therewith, that correspond with the user.

In other embodiments, storage 260 maintains a recall log that includes a history of actions taken with respect to the stored messages. The recall log can be accessible to a user, for example, via a user interface. In this regard, a user can view message actions taken in connection with sent messages. For example, a user may view which sent messages have been recalled, view sent messages, etc. In some cases, even if a message is recalled with respect to an intended recipient, the message may not be deleted from the message recall system such that the user can view the contents of previously sent messages, or data associated therewith. A recall log may also include details regarding deletion of a message(s). For example, a recall log may include an indication of a success or failure of a recall, a date and/or time of a recall, a recipient(s) for which the recall was successful or a failure, whether a recipient(s) viewed a particular message, etc.

In most embodiments, MAP 200 includes a transcoder 270 that reformats the message. The transcoder 270 may reformat the message for each communication method included in the contact sequence. For instance, the contact sequence may include voice service, email service, SMS, etc. The formats of the message between each contact method may be different. The user may provide a voice message initially, but when a reply to the voice message is not received, the transcoder 270 reformats the voice message and sends the textual message via the email service. The email message generated by transcoder 270 may include text that transcribes the content of the voice message. In one embodiment, the email message may include an attachment that is the voice message. Moreover, the SMS message generated by transcoder 270 includes text transcribed from the voice message. If necessary, the transcoder 270 may truncate the text as necessary to comply with the requirements for an SMS messages. In some embodiments, the user input may specify important parts of the message that should be retained by the transcoder 270 when switching between formats.

The transcoder 270 may reformat any message to a format supported by MAP 200. For instance, the transcoder 270 may provide text to voicemail, SMS to email, social networking to voicemail, MMS to SMS, MMS to email, cropping, resizing, and the like. In some embodiments, the transcoder 270 may receive updates from existing service providers to support new formats. And the transcoder 270 may receive new formats from new service providers that are added to MAP 200.

Accordingly, MAP 200 generates recallable messages for the users. The recallable messages are transmitted in various formats to the intended recipients. If the recipients are unresponsive, the messages are recalled.

Figure 3:
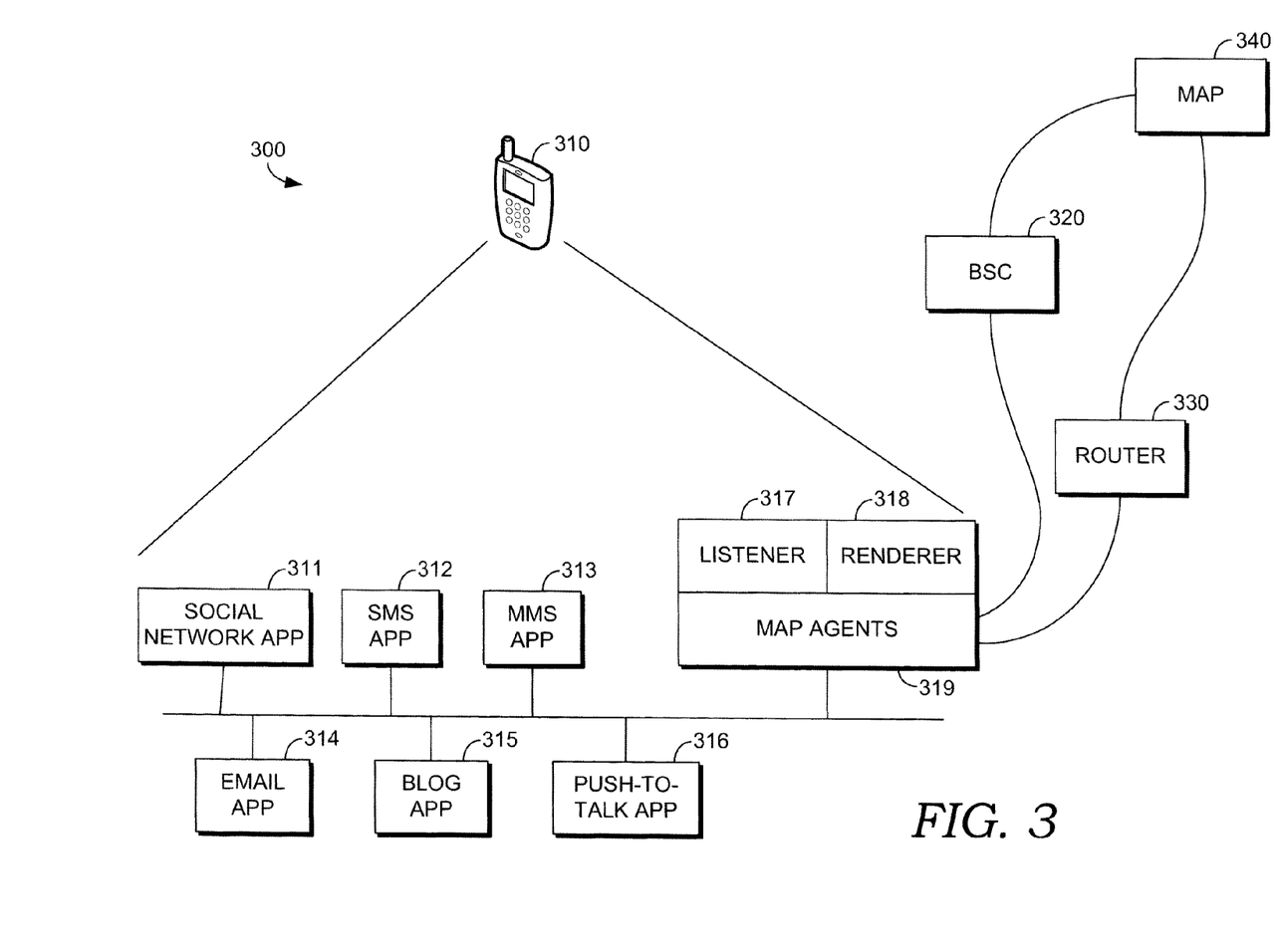
FIG. 3 is an architecture diagram of an exemplary communication device connected to a messaging alert platform in accordance with embodiments of the invention.

FIG. 3 is an architecture diagram of an exemplary communication device 310 connected to a messaging alert platform 340 in accordance with embodiments of the invention. The communication device 310 may connect to MAP 340 via a BSC 320 or router 330.

In one embodiment, the communication device 310 includes social network application 311, SMS application 312, MMS application 313, email application 314, blog application 315, and push-to-talk application 316. These applications 311-316 allow the user to generate various types of messages for transmission to one or more intended recipients. The social network application 312 allows the user to generate messages on a social networking site. The message may include board messages, instant messages, or email message. The MMS application 313 allows the user to generate multi-media messages that include video, images, etc. The email application 314 allows the user to generate email messages. The blog application 315 allows the user to provide blog messages. The push-to-talk application 316, allows the user to send voice messages.

In some embodiments, the communication device 310 may also include a listener 317, a renderer 318, and MAP agent 319. The listener 317 may intercept communications from the applications 311-316. The renderer 318 may generate appropriate graphical user interfaces that allow the user to provide information regarding communication preferences. Also, the renderer 318 may provide an interface for generating messages or viewing replies, recall logs, etc. The MAP agent 319 allows the communication device to interface with the MAP 340 via bidirectional communication.

The listener 317 may determine whether the user has initiated one of the applications 311-316 to generate a message. For instance, if the user initiates an email application 314, the listener 317 may intercept the request and trigger the renderer 318 to display a graphical user interface that inquires whether the user wishes to transmit the message via MAP 340. If the user opts to deliver the email message via MAP, the user may compose the email message via an interface provided by the email application 314. In turn, the MAP agent obtains the message from the email application 314 and communicates the message to the intended recipient via the MAP 340. The response may be received at MAP 340, which determines whether the response should be transmitted to the communication device 310. If the response is an actual reply from the intended recipient, MAP 340 formats the reply in accordance with the preferences stored for the user and communicates the formatted reply to the communication device. The reply may be displayed via renderer 318 or email application 314 in accordance with the preferences selected by the user.

In some embodiments, the user may select the MAP agent 319 as the communication agent for all communication sent or received from the communication device. Alternatively, the user may specify certain communication formats for the MAP agent 319. For instance, the user may indicate that only voice and SMS communication messages should be MAP communications that are transmitted via MAP 340. Further, the user may specify that the graphical user interface presented to the user for all MAP communications should be provided by renderer 318. Or the user may select to utilize the applications' graphical user interface to generate messages and view replies. As an example, the user may specify that MMS and social networking messages and replies should utilize the interface for MMS application 313 and social networking application 311 when generating the MAP messages and receiving the MAP replies.

Accordingly, the user of the communication device 310 may utilize the device in two modes: normal or MAP. In normal mode, the communications are routed to the intended recipients without consideration of the user preferences for delivery format, graphical user interface preferences, etc. In MAP mode, the preferences established by the user are consulted to determine whether a MAP communication is desired. If so, the appropriate graphical user interfaces are presented to generate a recallable message in the contact sequence established for the intended recipient.

MAP provides various graphical user interfaces to determine whether the user wishes to generate a normal message or a MAP message. If the user opts to select a MAP message, the preferences established by the user are considered when generating the response, contact sequence, and communicating the reply. Further, the MAP messages are recallable in the event that the intended recipient fails to respond within a specified period of time.

Figure 4A:
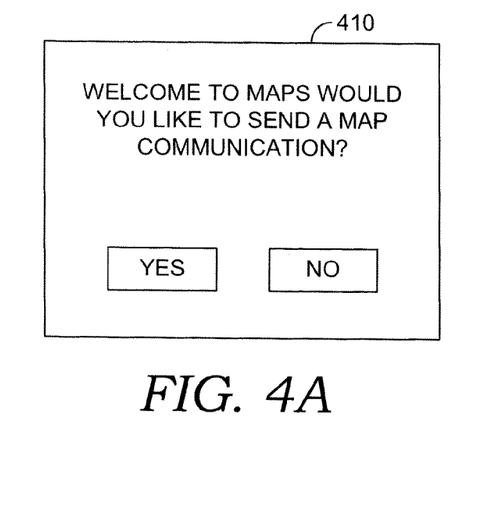
FIG. 4A is an illustration of an exemplary graphical user interface that allows a sender to initiate delivery of recallable messages on available communication paths to a recipient in accordance with embodiments of the invention.
Figure 4B:
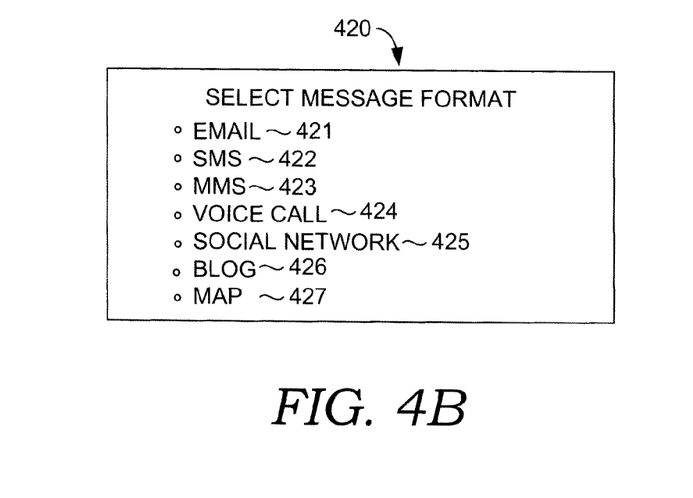
FIG. 4B is another illustration of an exemplary graphical user interface that allows a sender to format recallable messages in accordance with embodiments of the invention.
Figure 5A:
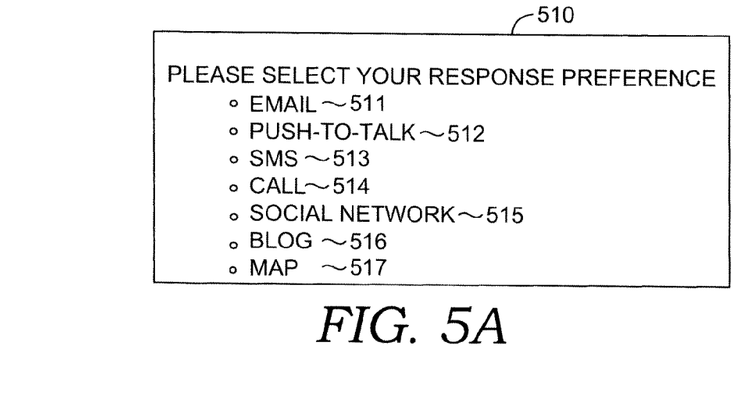
FIG. 5A is another illustration of an exemplary graphical user interface that allows a sender to specify response formats in accordance with embodiments of the invention.
Figure 5B:
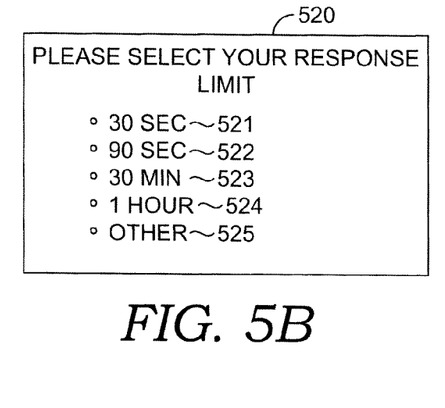
FIG. 5B is another illustration of an exemplary graphical user interface that allows a sender to specify response time periods in accordance with embodiments of the invention.
Figure 5C:
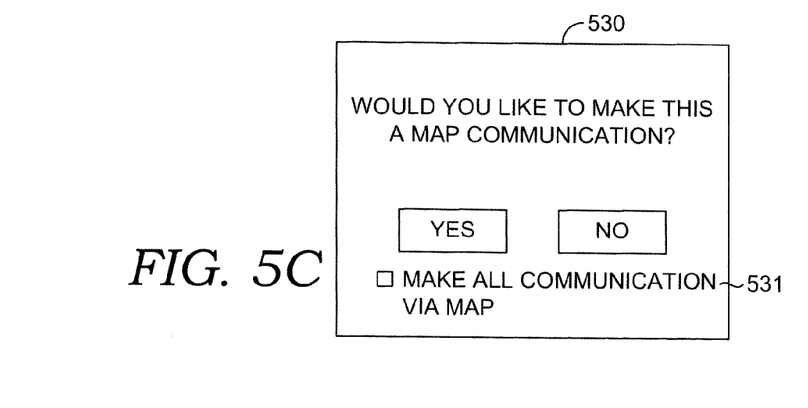
FIG. 5C is another illustration of an exemplary graphical user interface that allows a sender to specify whether all communications should be routed through a messaging alert platform in accordance with embodiments of the invention.

FIGS. 4 and 5 illustrate several exemplary graphical user interfaces. These graphical user interfaces are generated and displayed on the communication devices that generated the messages.

FIG. 4A is an illustration of an exemplary graphical user interface 410 that allows a sender to initiate delivery of recallable messages on available communication paths to a recipient in accordance with embodiments of the invention. The graphical user interface 410 queries whether the user intends the communication to be transmitted via MAP. The graphical user interface provides a "YES" button and a "NO" button. The user may select the "YES" button if the user intends to generate recallable messages via MAP. The user may select the "NO" button if the user intends to generate a normal message. The graphical user interface 410 may be generated by the renderer on the communication device when the user opens the MAP agent to initiate a MAP communication.

In some embodiments, a graphical user interface that inquiry about the message preference format for a current communication may be presented to the user. The format may include any format supported by the MAP. In turn, the user may select the desired message format for transmitting the message.

FIG. 4B is another illustration of an exemplary graphical user interface 420 that allows a sender to format recallable messages in accordance with embodiments of the invention. The formats displayed on the graphical user interface 420 are the formats supported by MAP. As MAP is updated to support additional formats, the renderer is updated to create new graphical user interfaces 420 that include the additional formats. In one embodiment, the graphical user interface 420 may provide selection for the following formats: email 421, SMS 422, MMS 423, voice call 424, social network 425, blog 426, and MAP 427. The email format 421 allows the user to contact the intended recipient via a recallable email. The SMS format 422 allows the user to contact the intended recipient via a recallable SMS. The MMS format 423 allows the user to contact the intended recipient via a recallable MMS. The voice call format 424 allows the user to contact the intended recipient via a recallable voicemail. The social network format 425 allows the user to contact the intended recipient via a recallable social network wall post, instant message, or email. The blog format 426 allows the user to contact the intended recipient via a recallable blog post. The MAP format 427 allows the user to contact the intended recipient via a recallable MAP message. The MAP message is delivered via MAP.

In yet another embodiment, a graphical user interface that inquiries about the message preference format for a reply may be presented to the user. The format may include any format supported by the MAP. In turn, the user may select the desired message format for receiving the reply message. The user may also be provided with a graphical user interface for specifying a reply period. Additionally, an intercept graphical user interface may be provided when the listener on the communication device intercepts a normal communication.

FIG. 5A is another illustration of an exemplary graphical user interface 510 that allows a sender to specify response formats in accordance with embodiments of the invention. The formats displayed on the graphical user interface 510 are the formats supported by MAP. As MAP is updated to support additional formats, the renderer is updated to create new graphical user interfaces 510 that include the additional formats. In one embodiment, the graphical user interface 510 may provide selection for the following formats: email 511, push-to-talk 512, SMS 513, voice call 514, social network 515, blog 516, and MAP 517. The email format 511 allows the user to receive the response from the intended recipient via email. The push-to-talk format 512 allows the user to receive the response from the intended recipient via push-to-talk. The SMS format 513 allows the user to receive the response from the intended recipient via SMS. The voice call format 514 allows the user to receive the response from the intended recipient via a voicemail or voice call. The social network format 515 allows the user to receive the response from the intended recipient via a social network wall post, instant message, or email. The blog format 516 allows the user to receive the response from the intended recipient via a blog post. The MAP format 517 allows the user to receive the response from the intended recipient via a MAP message.

FIG. 5B is another illustration of an exemplary graphical user interface 520 that allows a sender to specify response time periods in accordance with embodiments of the invention. The user may specify a response from the intended recipient should be received within a selected reply period. The reply period includes the time it takes to generate and transmit formatted message via the contact methods included in the contact sequence for the intended recipient. The reply period may be 30 seconds 521, 90 seconds 522, 30 minutes 523, 60 minutes 524, or other 525, which is a user generated reply period.

FIG. 5C is another illustration of an exemplary graphical user interface 530 that allows a sender to specify whether all communications should be routed through a messaging alert platform in accordance with embodiments of the invention. When the listener intercepts a normal communication, the renderer may display a graphical user interface 530 that inquires whether the user desires to route the current communication via MAP. The graphical user interface may include a "YES" button and a "NO" button. The user may select the "YES" button if the communication should be routed via MAP. The user may select the "NO" button if a normal communication is desired. Further, the user may specify on the graphical user interface 530 whether all communication on the communication device should be routed via MAP. The graphical user interface includes a checkbox 531 that allows the user to inform the listener that all communication on the device should be routed via MAP.

A computer storage media may store instructions to execute a method for routing recallable message. In some embodiment, the computer storage media may be a component of MAP. MAP receives a request to transmit a recallable message to an intended recipient. In turn, delivery is attempted in accordance with the contact sequence for the intended recipient and the reply period for the user. Based on whether a response is received from the intended recipient, an alternate communication mode is used to contact the recipient and the prior message sent via the previous communication mode is recalled.

Figure 6:
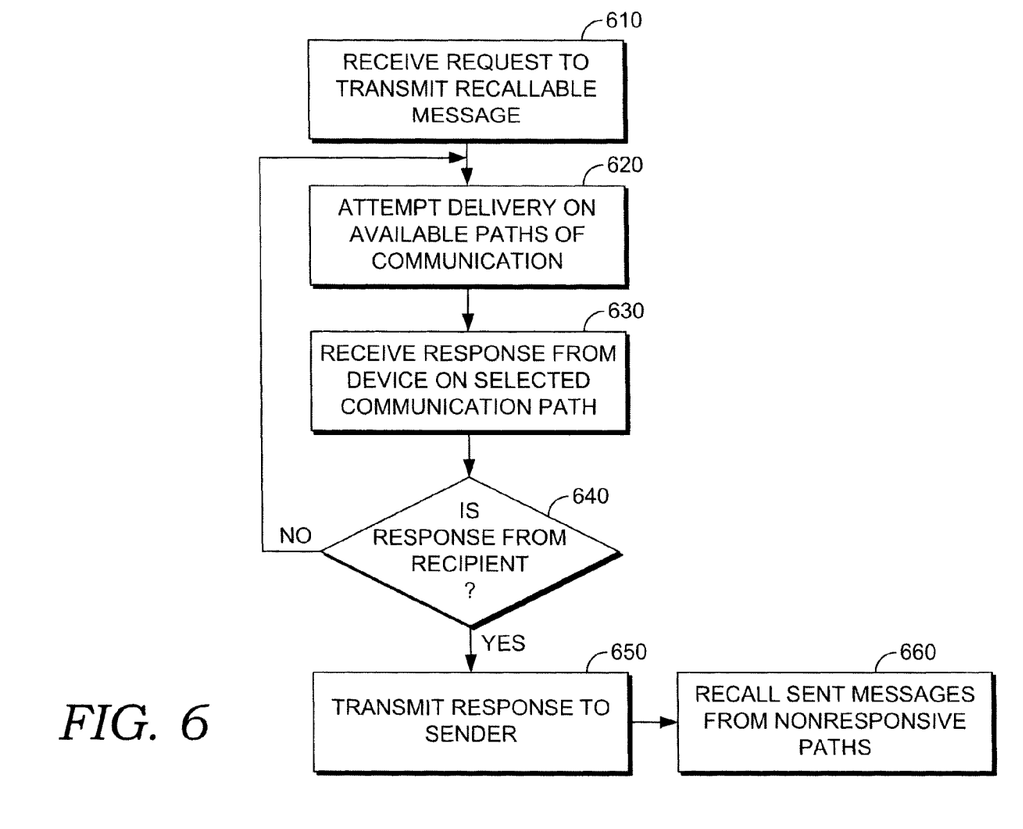
FIG. 6 is a flowchart that provides an exemplary method for routing recallable message in accordance with embodiments of the invention.

FIG. 6 is a flowchart that provides an exemplary method for routing recallable messages in accordance with embodiments of the invention. In step 610, MAP may receive a request to transmit a recallable message to the intended recipient. In some embodiments, the request may specify a response time period. MAP attempts delivery of the message on a communication path available for the intended recipient, in step 620. The available communication paths include any one of the following: electronic mail, social networking, instant messaging, blogs, tweets, and message alert platform messages, short message services, multimedia messaging services, and push-to-talk.

In step 630, MAP receives a response from the device of the intended recipient. The response is checked to verify that it was read by the intended recipient, in step 640.

If the response was not from the intended recipient, the method returns to step 620 and the next available communication path specified in the contact sequence for the intended recipient is attempted. In some embodiments, the contact sequence or delivery chain for the intended recipient may be specified by the sender or intended recipient. The contact sequence is used by MAP to select the next available communication path. In certain embodiments, MAP may generate a notification to inform the sender of the current communication path where delivery is being attempted.

If the response was from the intended recipient, in step 650, MAP transmits the response to the sender. In turn, if messages were sent via nonresponsive paths, those messages may be recalled by MAP, in step 660.

In an optional embodiment, a method to deliver recallable messages to a recipient is executed by MAP. MAP may send a recallable message from a sender to a recipient. The recallable message may include an importance level. In turn, MAP waits for a response from the recipient within a period of time. If no reply is received or an auto-reply is generated, MAP attempts delivery of the message on alternate communication paths associated with the recipient. In one embodiment, the communication paths comprise telephony communication services and Internet communication services. In another embodiment, the period of time that MAP waits is the same for each communication path. Alternatively, the period time that MAP waits for each path is proportional to the ratio of the total time set by the sender and the number of available paths for the recipient. In turn, MAP may reformat the message based on the message limitations associated with the selected communication path. If a reply that is not an auto-reply is received, MAP transmits the reply to the recipient.

In one embodiment, the user halts a contact sequence. For instance, a user may send an SMS message to an intended recipient. In turn, while MAP is attempting the various communication paths, the intended recipient may contact the user via a communication path not known (new email, phone, etc, neighbor's phone) to the user. Because the user was able to successfully communicate with the intended recipient, the user may stop the MAP from completing the contact sequence. In some embodiments, MAP may display a graphical user interface to allow the user to select which of the transmitted messages to recall.

Users expect messages to be delivered in real-time and have a lower tolerance for delays. Because of these expectations, users maintain multiple paths in which they communicate with each other. Often these communications via the multiple paths occur simultaneously. MAP provides a system for allowing the user to coordinate communication among these multiple communication methods.

For instance, a user may send an SMS to a friend for assistance with a car that has broken down. In this instance, the user may request that the friend pick them up at a specific location. If the message is delayed, or if their friend is not available, the sender will typically not receive any feedback that this occurred. This could leave them in a situation where they wait an unnecessary amount of time before determining an alternate course of action.

MAP provides the necessary notification to the user of delivery success. MAP provides a system to generate recallable messages via the multiple communication paths known for the friend. The user's communication device may be configured to generate a recallable message in response to a request by the user to format one or more messages as recallable messages. In turn, MAP which is communicatively coupled to the communication device receives a request to transmit a recallable message from the communication device. MAP notifies the user of delivery failures and successes. MAP attempts delivery of the recallable message on a first communication path of the multiple communication paths available for the friend. MAP may retry delivery of the recallable message on subsequent communication paths as specified in a contact sequence associated with the request or the friend. MAP may provide the user with a summary of the contact sequence for the friend and the current status of the delivery attempt. For instance, MAP may inform the user that an email and SMS message were sent, the times that those messages were sent, the wait period associated with those messages, whether those messages are recalled, the type of reply received, a summary of the reply, and the current format of the delivery attempt. MAP may filter responses received from the friend before transmitting the response to the user. Moreover, MAP may recall the recallable messages delivered to nonresponsive communication paths for the friend.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need be carried out or need to be carried out in the specific order described.

The invention claimed is:

1. A computer-implemented method to route recallable messages, the computer-implemented method comprising:
    receiving a request to transmit recallable messages from a sender;
    attempting delivery of the recallable message on first available communication path;
    receiving a response from a recipient's device that is reachable on the available communication path;
    determining whether response is from the recipient;
    if the response is from the recipient, transmitting the response to the sender; and
    if the response is not received from the recipient, performing the following:
        alerting the sender that a response is not available on the first communication path,
        recalling the message attempted on the first communication path,
        attempting subsequent delivery of the message on additional available communication paths, wherein a delivery chain having multiple communication paths is specified by the sender or recipient, and
        recalling the messages attempted on nonresponsive communication paths.

2. The computer-implemented method of claim 1, wherein the request specifies a response time period.

3. The computer-implemented method of claim 1, wherein the available communication paths include electronic mail.

4. The computer-implemented method of claim 1, wherein the available communication paths include social networking.

5. The computer-implemented method of claim 1, wherein the available communication paths include instant messaging.

6. The computer-implemented method of claim 1, wherein the available communication paths include blogs.

7. The computer-implemented method of claim 1, wherein the available communication paths include tweets.

8. The computer-implemented method of claim 1, wherein the available communication paths include message alert platform messages.

9. The computer-implemented method of claim 1, wherein the available communication paths include short message services.

10. The computer-implemented method of claim 1, wherein the available communication paths include multimedia messaging services.

11. The computer-implemented method of claim 1, wherein the available communication paths include push-to-talk.

12. The computer-implemented method of claim 1, further comprising:
generating a notification to inform the sender of the current communication path where delivery is being attempted.

13. One or more non-transitory computer-readable media having computer-useable instructions embodied thereon for performing a method to deliver recallable messages to a recipient, the method comprising:
sending a recallable message from a sender to a recipient on a first communication path included in a delivery chain having multiple communication paths is specified by the sender;
waiting for a response from the recipient within a period of time;
if no reply is received or an auto-reply is generated, alerting the sender that a response from the recipient is not available on the first communication path, recalling the message attempted on the first communication path, attempting subsequent delivery of the message on additional available communication paths specified in the delivery chain, and recalling the messages attempted on nonresponsive communication paths;
if a reply that is not an auto-reply is received, transmitting the reply to the sender.

14. The media of claim 13, wherein the communication paths comprise telephony communication services and Internet communication services.

15. The media of claim 13, further comprising:
formatting the message based on the message limitations associated with the selected communication path.

16. The media of claim 13, wherein the message includes an importance level.

17. The media of claim 13, wherein the period of time is the same for each communication path or the period of time for each path is proportional to the ratio of the total time set by the sender and the number of available paths for the recipient.

18. A computer system for generating recallable messages, the computer system comprising:
a messaging alert platform configured to receive a request to transmit a recallable message, to attempt delivery of the recallable message on a first communication path available for a recipient identified in the message, to retry delivery of the recallable message on subsequent communication paths as specified in a delivery chain of the request when a response is not received on the first communication path, to filter responses received from the recipient before transmitting the response to the sender, to recall the recallable messages delivered to nonresponsive communication paths, and to alert the sender that a response from the recipient is not available on the nonresponsive communication paths.

19. The computer system of claim 18, wherein the messaging alert platform includes an account manager, a transcoder, a control manager, a parser, storage, recall logic, and communication interfaces.

20. The computer system of claim 18, further comprising:
a communication device communicatively coupled to the messaging alert platform, wherein the communication device is configured to generate a recallable message in response to a request by a sender to format one or more messages as a recallable message, wherein the communication device includes several communication applications, including a messaging alert platform agent that intercepts communication messages and reformats the communication messages based on whether the user selects to transmit recallable communication messages.

* * * * *